United States Patent [19]
Sato

[11] Patent Number: 5,719,865
[45] Date of Patent: Feb. 17, 1998

[54] TRAFFIC SHAPING METHOD AND APPARATUS FOR ATM SWITCHING UNIT

[75] Inventor: Kenichi Sato, Tokyo, Japan

[73] Assignee: NEC Corporation, Tokyo, Japan

[21] Appl. No.: 569,868

[22] Filed: Dec. 8, 1995

[30] Foreign Application Priority Data

Dec. 8, 1994 [JP] Japan ................... 6-304445

[51] Int. Cl.⁶ ........................................ H04L 12/56
[52] U.S. Cl. ............................ 370/395; 370/428
[58] Field of Search ................... 370/60.1, 60, 61,
370/94.1, 94.2, 58.1, 58.2, 389, 392, 394,
395, 396, 397, 401, 404, 411, 412, 428,
444, 455, 902, 905, 908, 912, 535, 536,
541

[56] References Cited

U.S. PATENT DOCUMENTS

| | | | |
|---|---|---|---|
| 3,903,472 | 9/1975 | Qahl | 455/352 |
| 5,150,358 | 9/1992 | Punj et al. | 370/84 |
| 5,231,633 | 7/1993 | Hluchyj et al. | 370/94.1 |
| 5,253,247 | 10/1993 | Hirose et al. | 370/14 |
| 5,499,238 | 3/1996 | Shon | 370/60.1 |
| 5,517,495 | 5/1996 | Lund et al. | 370/85.6 |

FOREIGN PATENT DOCUMENTS 4-100342   4/1992   Japan .

*Primary Examiner*—Dang Ton
*Attorney, Agent, or Firm*—Foley & Lardner

[57] ABSTRACT

In a traffic shaping method for an asynchronous transfer mode (ATM) switching unit, ATM cells output from an ATM switch for each output line and each traffic type are stored. In accordance with a traffic pattern defining an ATM cell burst length and a burst interval which are preset in correspondence with each traffic type, the ATM cells stored for each output line and each traffic type are multiplexed at a predetermined timing for each line. The multiplexed ATM cells are output to an output line. A traffic shaping apparatus for the ATM switching unit is also disclosed.

8 Claims, 2 Drawing Sheets

TRAFFIC SHAPING METHOD AND APPARATUS FOR ATM SWITCHING UNIT

BACKGROUND OF THE INVENTION

The present invention relates to a traffic shaping method and apparatus for an ATM (Asynchronous Transfer Mode) switching unit and, more particularly, to a traffic shaping method and apparatus for an ATM switching unit, for shaping a plurality of traffic types in an output line whose rate is lower than that of the output port of an ATM switch.

A conventional traffic shaping technique of this type is disclosed in Japanese Patent Laid-Open No. 4-100342 in which a plurality of traffic shaping functions are provided in a communication network. According to this prior art, VC (Virtual Channel) policing is performed at the entrance of each ATM node system, and policing control at the entrance of a VP (Virtual Path) is performed in an ATM link system. On the other hand, although VP shaping need not be performed on the output side of each ATM link system, VC shaping and VP shaping are performed on the output side of the ATM node system. Predetermined time intervals are measured at the entrance and exit of any line. These time intervals are maintained, and at the same time, traffic not exceeding the predetermined number of cells within a predetermined period of time is passed.

According to a general scheme, a traffic shaping function is imparted to a line unit, cells output from the port of an ATM switch are separated in correspondence with a plurality of lines, and the separated cells are input to the line unit. In the line unit, the cells are distributed to queues for the respective traffic types, the cells are read from the respective queues by a traffic shaper present in the line unit, and the cells are output onto the line.

According to the conventional traffic shaping method for an ATM switching unit described above, in a communication network, a traffic shaping function is provided not only in a switching unit directly connected to a terminal but also in each switching unit in the network together with a policing function.

According to the latter conventional example, since the traffic shaping function and the queues for the respective traffic types are provided in the line unit, the hardware amount on the line side is increased, and line cost reduction and compactness are impaired.

SUMMARY OF THE INVENTION

It is an object of the present invention to provide a traffic shaping method and apparatus for an ATM switching unit, in which an increase in hardware of a line unit is prevented, and line cost reduction and compactness are improved.

In order to achieve the above object of the present invention, there is provided a traffic shaping method for an asynchronous transfer mode (ATM) switching unit, comprising the ATM cell storage step of storing ATM cells output from an ATM switch for each output line and each traffic type, and the ATM cell output step of, in accordance with a traffic pattern defining an ATM cell burst length and a burst interval which are preset in correspondence with each traffic type, multiplexing, at a predetermined timing for each line, the ATM cells stored for each output line and each traffic type, and outputting the multiplexed ATM cells to an output line.

DESCRIPTION OF THE PREFERRED EMBODIMENT

The present invention will be described with reference to a preferred embodiment in conjunction with the accompanying drawings.

Figure 1:
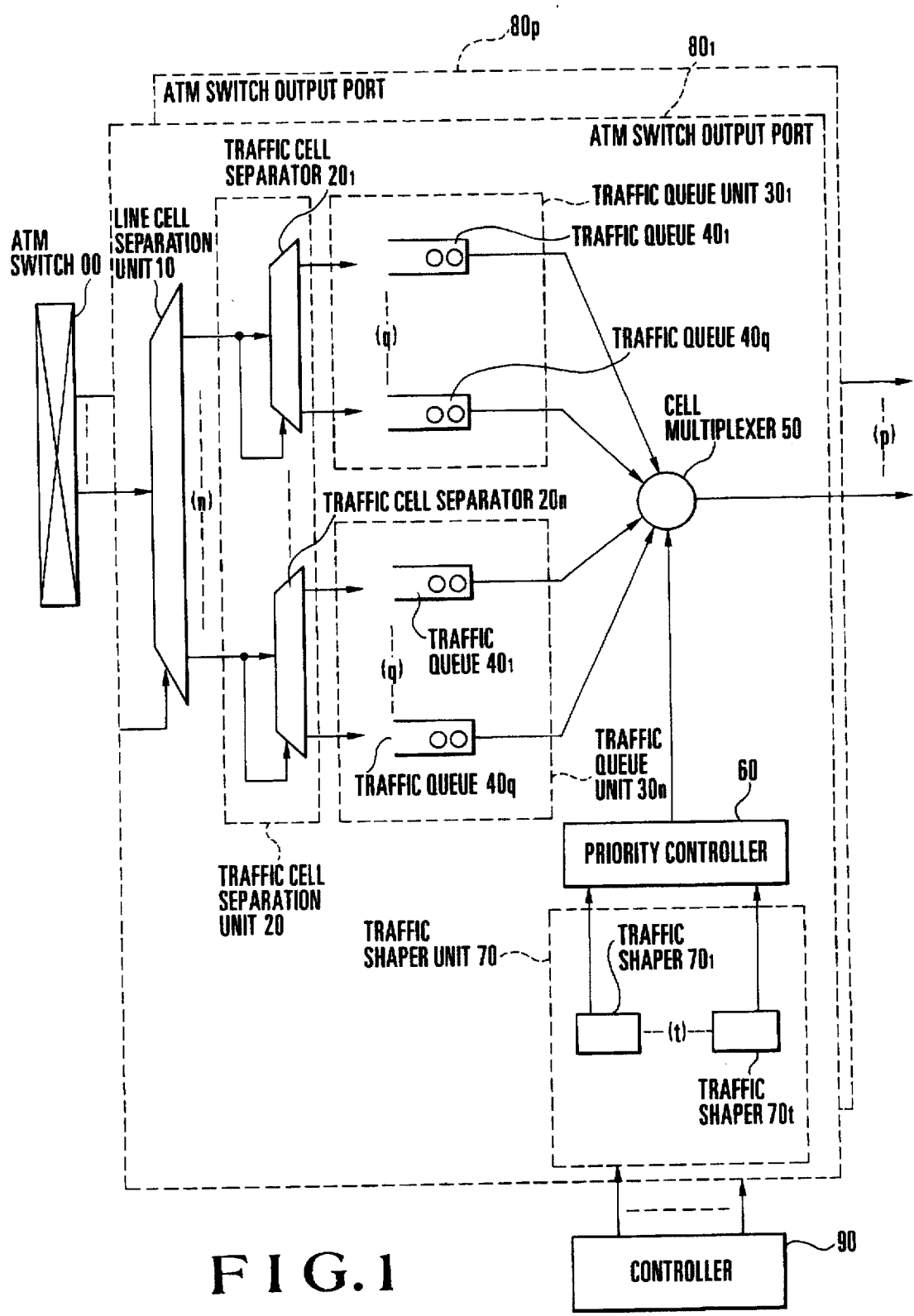
FIG. 1 is a block diagram showing a traffic shaping apparatus for an ATM switching unit according to an embodiment of the present invention.
Figure 2:
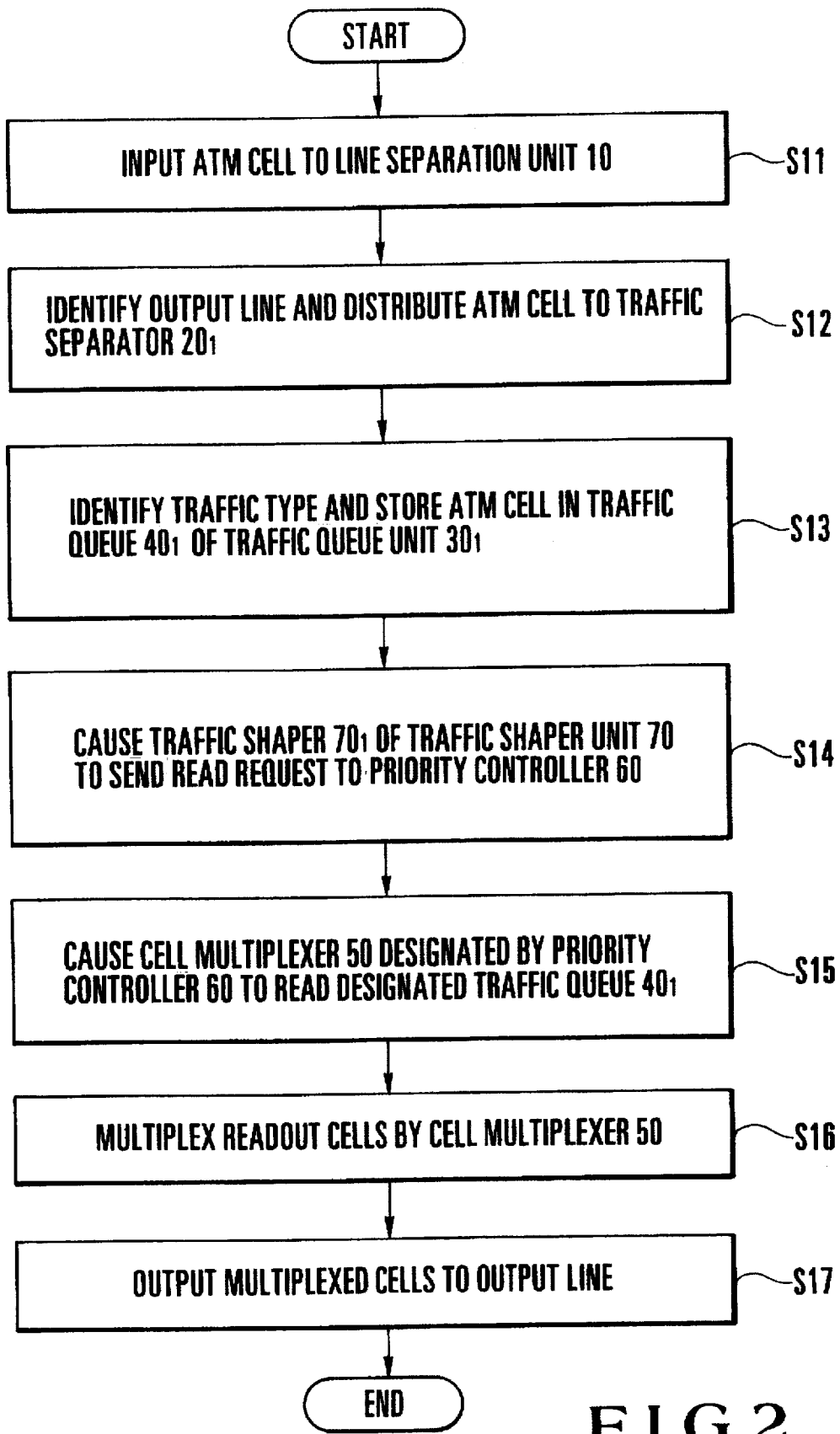
FIG. 2 is a flow chart showing the operation of the traffic shaping apparatus for an ATM switching unit shown in FIG. 1.

FIG. 1 shows an ATM switching unit to which a traffic shaping method for an ATM switching unit according to the present invention is applied.

The ATM switching unit comprises an ATM switch 00 and ATM switch output ports $80_1$ to $80_p$ for receiving outputs from the ATM switch 00. Each of the ATM switch output ports $80_1$ to $80_p$ comprises a line separation unit 10 for n lines, a traffic cell separation unit 20 having traffic cell separators $20_1$ to $20_n$, traffic queue units $30_1$ to $30_n$ having q traffic queues $40_1$ to $40_q$, a cell multiplexer 50 for receiving outputs from the traffic queue units $30_1$ to $30_n$, a priority controller 60 for controlling the cell multiplexer 50, and a traffic shaper unit 70 having traffic shapers $70_1$ to $70_r$ connected to the priority controller 60. Reference numeral 90 denotes a controller for the ATM switching unit.

The line cell separation unit 10 separates ATM cells input from the ATM switch 00 into cells for the respective lines in accordance with destinations and outputs the cells to the traffic cell separation unit 20.

The traffic cell separators $20_1$ to $20_n$ of the traffic cell separation unit 20 classify and distribute the input ATM cells for the respective lines into ATM cells for the q traffic types. The classified ATM cells are output to the traffic queue units $30_1$ to $30_n$.

The traffic queue units $30_1$ to $30_n$ store the input ATM cells in the corresponding traffic queues $40_1$ to $40_q$. In this embodiment, the number of traffic types is three. That is, cells are classified into a CBR (Constant Bit Rate) cell for transmitting constant-rate data, a VBR (Variable Bit Rate) cell for transmitting variable-rate data, and an ABR (Available Bit Rate) cell for transmitting LAN (Local Area Network) data.

The cell multiplexer 50 is operated in response to a predetermined constant cell read timing. A cell is read at each cell read timing from one traffic queue designated in one line at a rate equal to the data rate of the output port. The read order has a rotational priority, and the cells are read from the respective lines at the same period in a predetermined order. The lines are rotationally selected in an order of lines 1 to n. The read cells are multiplexed by the cell multiplexer 50 and output from the ATM switch output ports $80_1$ to $80_p$ onto the line.

The cell flow has a time slot upon simple multiplexing for each line. When a given time slot is taken as an example, a specific line from which a cell is transmitted in the given time slot is predetermined. For this reason, when the cell flow is to be finally separated in the latter stage, and the separated cells are to be transported to the respective lines, a large-capacity buffer need not be used. Cells can flow on the final subscriber line in a traffic pattern of the output port.

A plurality of traffic patterns corresponding to the traffic queues $40_1$ to $40_q$ are registered in advance in the traffic shaper unit 70 by the controller 90 for the ATM switching unit. The traffic pattern is defined as a cell flow on an output line, which is determined by an instantaneous burst length representing the maximum number of cells to be continuously transmitted, and an instantaneous burst interval between this instantaneous burst and the next instantaneous burst. These traffic patterns are respectively registered in the traffic shapers $70_1$ to $70_r$ stored in the traffic shaper unit 70 arranged in each of the ATM switch output ports $80_1$ to $80_p$ and are commonly used for all the lines. These t traffic shapers $70_1$ to $70_r$ designate the reading methods from the line traffic queues $40_1$ to $40_q$. This designation is performed by the controller 90 for the ATM switching unit. For example, the traffic shaper $70_1$ designates a read operation from the CBR queue, and the traffic shaper $70_2$ designates a read operation from the VBR queue. In this manner, the traffic shaping functions are predetermined in the respective traffic shapers. Each of the traffic shapers $70_1$ to $70_r$ transmits a cell read request at a corresponding one of the cell timings allocated for the respective output lines in a time-division manner from the controller 90 of the ATM switching unit. Upon reception of the cell read request, when a queue subjected to the cell read request is caused to correspond to the read target line at this moment, the priority controller 60 controls the read operation from this queue in the cell multiplexer 50. If no queue subjected to the read request is not caused to correspond to the read target line at this moment, the read operation at this timing is not executed. Whether a read operation from a queue caused to correspond to the line is determined at the next read timing in the same manner as described above. A cell read operation is executed or postponed.

The operation of this embodiment will be described below.

When an ATM cell is input from the ATM switch 00 to the line cell separation unit 10 of the ATM switch output port $80_1$ (step S11), the line cell separation unit 10 identifies the output line in accordance with the cell address and distributes this cell to the corresponding line traffic separation unit $20_1$ (step S12). The traffic separator $20_1$ identifies the traffic type of the distributed ATM cell and stores the cell in the traffic queue $40_1$ of the corresponding traffic queue unit $30_1$ (step S13). On the other hand, in the traffic shaper unit 70, in accordance with an instruction from the controller 90 for the ATM switching unit, the traffic shaper $70_1$ represents an ATM cell read timing to the priority controller 60 and outputs a read request to the priority controller 60 (step S14). When the rotational priority of the cell multiplexer 50 reaches the traffic queue unit $30_1$, the priority controller 60 causes the queue $40_1$ to correspond to the read target line to output readout information from the queue $40_1$ to the multiplexer 50 (step S15). Predetermined multiplexing is performed (step S16), and the multiplexed information is output to the output line (step S17).

A cell read request from one traffic shaper represents whether the corresponding queues of all the lines within the ATM output ports are read. Since a plurality of traffic shapers are arranged, cell read requests may be simultaneously output from the traffic shaper unit 70 at a given timing. In this case, however, the priority controller 60 executes a read operation from one queue of one line at a given cell timing. The priority controller determines one of the requests from the plurality of traffic shapers in accordance with the rotational priority, and a read operation is started. When the read operation is completed for all the lines, the next request is accepted.

As has been described above, the traffic shaping function of the present invention is performed.

ATM cells are stored for the respective lines and the respective traffic type queues arranged in the output ports, and the respective output lines are scanned at a constant period in a predetermined order. Shaping is performed such that an ATM cell corresponding to the output request is read at a data rate corresponding to the traffic type for each line and is output to the corresponding line. Traffic shaping is concentrated on the ATM switch output port connected to the input of the line unit. A large-capacity memory need not be arranged for each line. Hardware can be greatly reduced, and a compact apparatus can be obtained at low line cost.

What is claimed is:

1. A traffic shaping method for an asynchronous transfer mode (ATM) switching unit, comprising:

an ATM cell storage step of storing ATM cells output from an ATM switch for each output line and each traffic type; and an ATM cell output step of, in accordance with a traffic pattern defining an ATM cell burst length and a burst interval which are preset in correspondence with said each traffic type, multiplexing, at a predetermined timing for said each output line, the ATM cells stored for said each output line and said each traffic type, and outputting the multiplexed ATM cells to an output line, wherein an output port speed of the ATM switching unit is faster than a line speed of said each output line, and said traffic pattern is common to said each output line, wherein the ATM cell storage step comprises a first step of distributing the ATM cells for said each output line, and the a second step of distributing the ATM cells distributed for said each output line and storing each of the ATM cells distributed in the second step in a corresponding one of a plurality of queues, and wherein the ATM cell output step comprises a third step of reading, for said each output line in a predetermined order, the ATM cells from said corresponding one of the plurality of queues which has received a read request on the basis of a corresponding traffic pattern, and a fourth step of multiplexing the read ATM cells on the output line and outputting the multiplexed ATM cells on the output line.

2. A method according to claim 1, wherein said predetermined order comprises a rotational priority order.

3. A method according to claim 1, wherein said predetermined order comprises a rotational priority order when ATM cell read requests are generated by a plurality of traffic types.

4. A method according to claim 1, wherein the ATM cell burst length indicates a number of ATM cells ready for a continuous transmission and the burst interval indicates a transmission interval of ATM cells.

5. A traffic shaping apparatus for an asynchronous transfer mode (ATM) switching unit, comprising:

first separating means for separating ATM cells received from an output of an ATM switch;

second separating means for separating the ATM cells from said first separating means;

a plurality of queues for storing the ATM cells from said second separating means for each of a plurality of traffic types;

traffic shaper means, set with traffic patterns defining ATM cell burst lengths and burst intervals which correspond to said plurality of traffic types, for requesting an ATM cell read operation for each traffic type at a cell timing allocated for an output line of the traffic shaping apparatus in a time-division manner;

multiplexing means for reading the ATM cells from one of said plurality of queues which has received a read request from said traffic shaper means, multiplexing the read ATM cells, and outputting the multiplexed ATM cells to the output line of the traffic shaping apparatus at a data rate in accordance with a corresponding traffic pattern; and control means for controlling the ATM cell read operation of said multiplexing means in accordance with the read request from said traffic shaper means, wherein said multiplexing means reads the ATM cells from said one of said plurality of queues which has received the read request on the basis of the corresponding traffic pattern, in a predetermined order, and wherein a speed of the output from the ATM switch is faster than a line speed of the output line and the traffic patterns are common to the output line.

6. An apparatus according to claim 5, wherein said predetermined order comprises a rotational priority order.

7. An apparatus according to claim 5, wherein said predetermined order comprises a rotational priority order when ATM cell read requests are generated by a plurality of traffic types.

8. An apparatus according to claim 5, wherein the ATM cell burst lengths indicate a number of ATM cells ready for a continuous transmission and the burst intervals indicate a transmission interval of ATM cells.

* * * * *